July 24, 1962 A. M. FARIES ET AL 3,046,495

HIGH-VOLTAGE INVERTER USING LOW-VOLTAGE TRANSISTORS

Filed Sept. 27, 1957

INVENTORS
MAURICE C. HARP
ALFRED M. FARIES

BY Lippincott, Smith & Ralls

ATTORNEYS

United States Patent Office 3,046,495

Patented July 24, 1962

3,046,495

HIGH-VOLTAGE INVERTER USING LOW-VOLTAGE TRANSISTORS

Alfred M. Faries, Menlo Park, and Maurice C. Harp, Belmont, Calif., assignors to Lenkurt Electric Co. Inc., San Carlos, Calif., a corporation of Delaware Filed Sept. 27, 1957, Ser. No. 686,650

2 Claims. (Cl. 331—113)

This invention relates to electrical apparatus for converting direct-current power into alternating-current power, commonly called an inverter, and in particular to an improved inverter using low-voltage transistors, which is adapted for efficient operation from a relatively high-voltage direct-current source.

Electron tube inverters for converting direct-current power into alternating-current power are well known and extensively used. Since the advent of the transistor, transistorized inverters have been developed to take advantage of the greater compactness and other advantages of transistors over electron tubes. However, presently available transistors are relatively low-voltage devices and while satisfactory transistorized inverters have heretofore been developed that operate with reasonable efficiency from low-voltage direct-current sources, comparable efficiency has not heretofore been attained in transistorized inverters that must operate from relatively high-voltage direct-current sources. With the transistorized inverters heretofore available, it has been necessary to employ a dropping resistor in series with the high-voltage direct-current source in order to reduce the supply voltage to a value appropriate for operating the transistors, and power losses in such dropping resistors have necessarily resulted in a low power-conversion efficiency. Therefore, a principal object of this invention is to provide a transistorized inverter capable of operating efficiently from relatively high-voltage direct-current sources without using such a dropping resistor.

According to this invention a novel and improved inverter comprises a plurality of transistors connected in a series-parallel circuit, hereinafter described, whereby normal operating voltages are supplied to the several low-voltage transistors from a relatively high-voltage source, without the use of dropping resistors. These transistors are connected to a single multi-winding, saturable-core transformer to form a plurality of switching-type oscillatory circuits, each comprising a pair of transistors between which current is switched back and forth repetitively by periodic saturation of the transformer core. The several oscillatory circuits are coupled together through said transformer so that said circuits oscillate, and current is switched within the transistor pair thereof, in synchronism with one another, whereby alternating-current power is efficiently transferred to an output winding on the same transformer.

The foregoing and other aspects of this invention may be better understood from the following illustrative description and accompanying drawings. The scope of the invention is pointed out in the appended claims.

Figure 1:
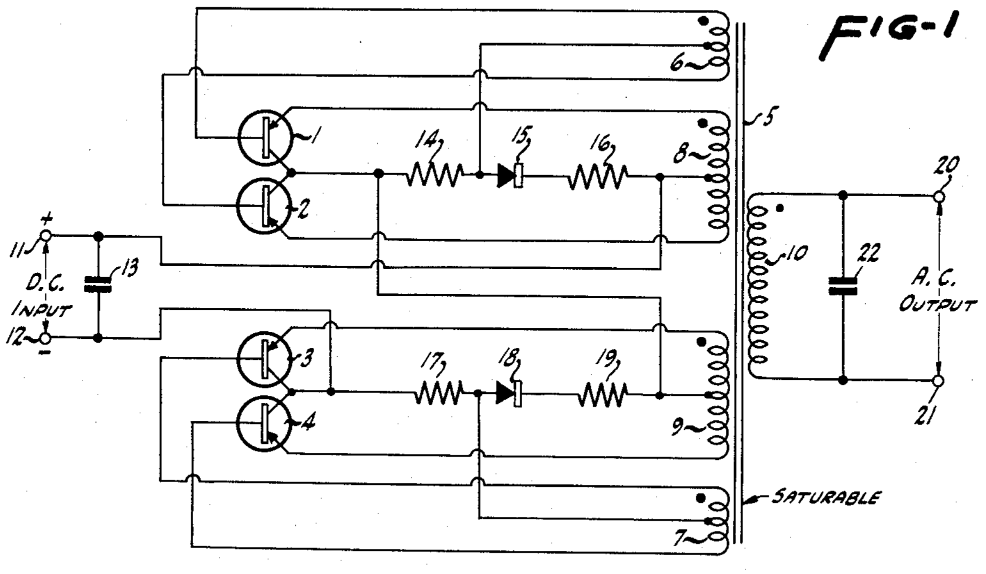
FIG. 1 is a schematic circuit diagram of an improved inverter.

Referring to FIG. 1 of the drawings, an improved inverter comprises four transistors 1, 2, 3 and 4. Each transistor preferably is of a conventional junction type, having base, emitter and collector terminals. In the drawing the transistors are represented by conventional symbols that are well known to those skilled in the art. The transistors illustrated are of the p-n-p type but n-p-n transistors may be used if certain circuit modifications are made as hereinafter described. A transformer 5 is provided with five inductively coupled windings 6, 7, 8, 9 and 10. The relative polarities of these five windings are such that the upper terminals as illustrated in the drawings are terminals of similar polarities as is represented in a conventional manner by dots placed beside these terminals on the drawing. Each of the windings 6, 7, 8 and 9 has a center tap. It will be understood, of course, that a center-tapped winding may be made up of two separate windings connected together in series. Transformer 5 has a saturable core made of magnetic material having a substantially rectangular hysteresis loop. Such materials are well known to those skilled in the art.

Winding 6 is connected between the base terminals of transistors 1 and 2, as shown. Winding 7 is connected between the base terminals of transistors 3 and 4. Winding 8 is connected between the emitter terminals of transistors 1 and 2. Winding 9 is connected between the emitter terminals of transistors 3 and 4. The collector terminals of transistors 1 and 2 are connected together and the collector terminals of transistors 3 and 4 are connected together. It will be noted that the emitter and base terminals of each transistor are respectively connected to winding terminals of like relative polarity.

Input terminals 11 and 12 are provided for receiving the input direct-current power. Terminals 11 and 12 may be connected across any direct-current source, such as a battery, for applying therebetween a direct voltage of appropriate magnitude. In the circuit illustrated in FIG. 1, the terminal 11 should be connected to the positive terminal of the direct-current source, and terminal 12 should be connected to the negative terminal of the direct-current source. A by-pass capacitor 13 is provided between terminals 11 and 12 for by-passing any alternating current that may be present.

The center tap of winding 8 is connected to positive input terminal 11. Thus, winding 8 provides direct-current paths between input terminal 11 and the emitter terminals of transistors 1 and 2. The collector terminals of transistors 1 and 2 are connected to the center tap of winding 9, which thus provides direct-current paths between the collector terminals of transistors 1 and 2 and the emitter terminals of transistors 3 and 4. The collector terminals of transistors 3 and 4 are connected to negative input terminal 12. Thus, the four transistors are connected in a series-parallel D.C. circuit between input terminals 11 and 12 so that the direct voltage applied across each transistor is approximately equal to one-half the input voltage applied between terminals 11 and 12. Therefore, the input voltage may be twice as large as the appropriate supply voltage for operating each transistor. For example, if the appropriate transistor-supply voltage is 48 volts, the input voltage may be 96 volts.

Appropriate operating potentials for the transistor base terminals are established by two bias circuits which will now be described. A resistor 14 is connected between the collector terminals of transistors 1 and 2 and the center tap of winding 6. A diode rectifier 15 in series with a resistor 16 is connected between the center taps of windings 6 and 8, as shown, with rectifier 15 poled to conduct current from winding 6 to winding 8. Similarly, a resistor 17 is connected between the collector terminals of transistors 3 and 4 and the center tap of winding 7. A diode rectifier 18 in series with a resistor 19 is connected between the center taps of windings 7 and 9, with rectifier 18 poled to conduct current from winding 7 to winding 9.

Winding 10 is connected between a pair of output terminals 20 and 21. A capacitor 22 may be connected in parallel with winding 10, as shown, and may tune this winding to resonance at the frequency of the alternating-current output.

When the input direct voltage is first applied between input terminals 11 and 12, the voltages across rectifiers 15 and 18 are of reverse polarity relative to the direction in which current flows readily through the rectifier. Therefore, at this instant the two rectifiers are substantially non-conducting and the base terminal of each transistor is initially biased to a negative potential relative to the emitter terminal of the same transistor. Consequently, the four transistors are each biased to conduct current readily for starting the switching action hereinafter described. At this time current flows through the emitter-to-base circuit of each transistor. The magnitudes of such currents is limited by resistors 14 and 17. Currents also flow through the collector circuits of all four transistors.

Consider first the circuit comprising the pair of transistors 1 and 2. If the currents conducted by transistor 1 were precisely equal to the currents conducted by transistor 2, no magnetic flux would be induced thereby in the core of transformer 5 because equal currents would flow in opposite directions through respective halves of each transformers winding. However, in practice some unbalance of the currents is sure to occur due to noise fluctuation and other causes. Such unbalance initiates the switching action that will be described.

For example, assume that the emitter current of transistor 1 momentarily exceeds the emitter current of transistor 2. The excess current produces magnetic flux in the core of transformer 5 which induces across each of the transformer windings a voltage porportional to the rate of flux change. The voltage so induced across winding 6 makes the base terminal of transistor 1 more negative than the base terminal of transistor 2, which further increases the emitter current of transistor 1 relative to the emitter current of transistor 2, so that a cumulative action is started which continues until transistor 2 is substantially cut off.

The currents conducted by transistor 1 continue to increase until the core of transformer 5 saturates. Upon saturation of transformer 5 the induced voltages across the transformer windings suddenly disappear and currents begin to flow through transistor 2. As the currents through transistor 2 increase voltages of the opposite polarity are induced across the transformer windings and the cumulative action described above continues in the opposite direction until the core of transformer 5 saturates in the opposite magnetic polarity. Thus, a switching-type oscillatory circuit is provided wherein currents are periodically switched back and forth between transistors 1 and 2 while the core of transformer 5 is driven to saturation in opposite magnetic polarities alternately. This type of switching circuit has a very high direct-current to alternating-current power conversion efficiency because the voltage across the conducting transistor of each pair is small while the voltage across the non-conducting transistor is high, approximately twice the normal transistor supply voltage or approximately equal to the entire input voltage applied between terminals 11 and 12. Consequently, the power dissipation in each transistor is relatively low.

A similar switching-type oscillation occurs in the circuit comprising transistors 3 and 4. Thus, the complete inverter circuit comprises two switching-type oscillatory circuits. Because both of the two oscillatory circuit comprises windings of the same transformer 5, and since the switching action in each oscillatory circuit is timed by saturation of the common transformer core, the two oscillatory circuits operate in synchronism and transfer power efficiently to the output winding 10.

As hereinbefore stated, the two rectifiers 15 and 18 of the bias circuits are initially non-conductive for applying a large emitter-to-base starting bias to each transistor for reliably starting the oscillatory switching operation herein described. Once the switching operations are in progress sufficient currents flow through the bias circuits to produce across resistors 14 and 17 voltage drops sufficient to reverse the voltages across rectifiers 15 and 18, whereupon the two rectifiers become low-resistance, conductive circuit elements. Thereafter, currents flow through resistors 16 and 19 as well as resistors 14 and 17. By appropriately proportioning the relative resistances of resistors 14 and 16 and 17 and 19 the circuit can be designed, according to principles well known to those skilled in the art, to provide the most efficient operating bias for steady-stata operation. Thus, the novel bias circuits herein illustrated and described automatically provide one value of emitter-to-base bias voltages for reliable starting and another value of bias voltages for most efficient steady-state operation.

In the particular embodiment illustrated in FIG. 1, winding 6 and 7 have more turns than windings 8 and 9 so that the induced voltages across windings 6 and 7 are of larger amplitude than the induced voltages across windings 8 and 9. In the embodiment illustrated in FIG. 2, windings 6 and 7 usually have less turns than windings 8 and 9.

Figure 2:
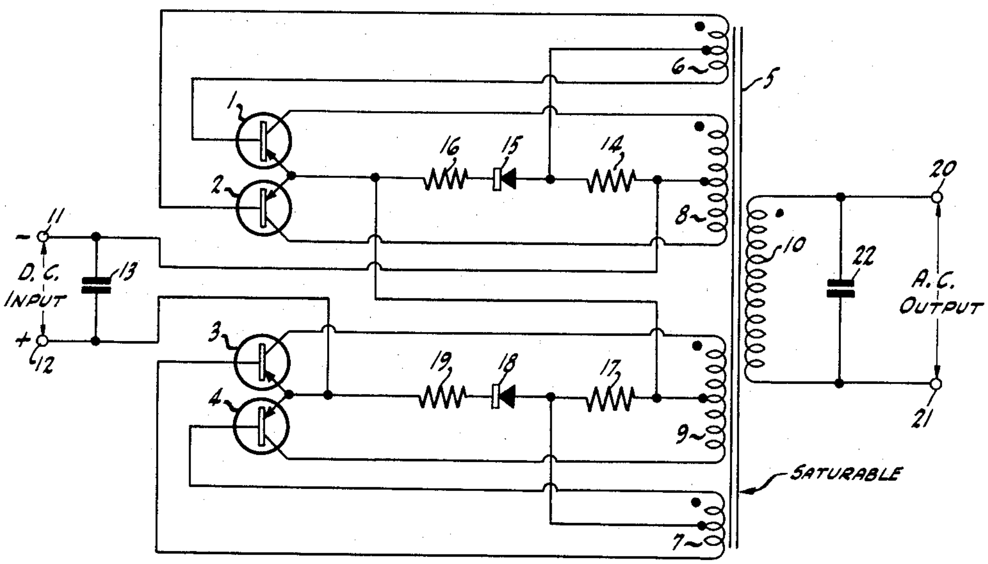
FIG. 2 is a schematic circuit diagram of another improved inverter.

FIG. 2 illustrates another inverter which is generally similar in principle to the inverter illustrated in FIG. 1 but has somewhat different circuit connections. The same circuit elements may be used in both inverters, except for possible differences in the relative numbers of turns on the transformer windings as hereinbefore discussed, and therefore the corresponding circuit elements are identified by the same reference numbers in FIGS. 1 and 2. The two circuits differ substantially only in the manner in which the various circuit elements are connected together.

Specifically the circuit shown in FIG. 2 differs from the circuit shown in FIG. 1 in the following respects. In each transistor, the emitter and collector connections have been interchanged so that, in the FIG. 2 circuit winding 8 is connected between the collector terminals of transistors 1 and 2 while the emitter terminals of transistors 1 and 2 are connected together, and winding 9 is connected between the collector terminals of transistors 3 and 4 while the emitter terminals of transistors 3 and 4 are connected together. Consequently the direct current must flow through the circuit in the reverse direction to the current flow in the FIG. 1 circuit, and therefore the polarity of the input voltage must be reversed. Thus, with the FIG. 2 circuit input terminal 11 should be connected to the negative terminal of the direct-current source, and input terminal 12 should be connected to the positive terminal of the direct-current source.

Also, the two bias circuits 14, 15 and 16, and 17, 18 and 19, must be turned end-for-end, so that resistors 14 and 17 remain in the collector-to-base circuits of respective transistor pairs while rectifiers 15 and 18 and resistors 16 and 19 remain in the emitter-to-base circuits of respective transistor pairs. In both circuits it will be noted that rectifiers 15 and 18 are poled to conduct current from the base toward the emitter so that in the starting operation the input voltage provides a reverse voltage across each rectifier whereby the rectifiers initially are substantially non-conductive but become conductive during steady-state operation of the circuit.

In the embodiment shown in FIG. 1, the base and emitter terminals of each transistor are respectively connected to winding terminals of like polarity so that an increase in current through any transistor tends to increase further the current through that transistor and to reduce the currents through the other transistor of the same pair. For similar purposes in the embodiment shown in FIG. 2, the base and collector terminals of each transistor are connected to winding terminals of opposite polarity.

The two embodiments illustrated and described comprise transistors of the p-n-p type. In either embodiment, transistors of the n-p-n type may be substituted for the transistors shown, provided that the polarity of the input voltage is reversed and that rectifiers 15 and 18 are turned around so that they conduct current most easily in the opposite direction. If desired, for handling larger currents and more power, additional transistors may be connected in parallel with the transistors shown.

Each of the two embodiments illustrated comprises two pairs of transistors connected in series between the input terminals. Therefore, these circuits allow the use of an input voltage that is twice the normal supply voltage of each transistor. It is evident that the principles herein disclosed can also be utilized to provide circuits operating from input voltages that are three or more times as large as the normal supply voltage for each transistor, by connecting in series three or more pairs of transistors, with each transistor pair connected to a pair of windings on the common multi-winding transformer in the manner herein disclosed.

It should be understood that this invention in its broader aspects is not limited to the specific examples herein described, and that the following claims are intended to cover all changes and modifications within the true spirit and scope of the invention.

What is claimed is:

1. Electrical apparatus for converting direct-current power into alternating-current power, comprising four transistors each having base, emitter and collector terminals, a saturable-core transformer having five windings, a first one of said windings being connected between the base terminals of first and second ones of said transistors, a second one of said windings being connected between the base terminals of third and fourth ones of said transistors, a third one of said windings being connected between the emitter terminals of said first and second transistors, the collector terminals of said first and second transistors being connected together whereby said first and second transistors form a first pair, a fourth one of said windings being connected between the emitter terminals of said third and fourth transistors, the collector terminals of said third and fourth transistors being connected together, whereby said third and fourth transistors form a second pair, each of said first, second, third and fourth windings having a center tap, first and second input terminals that a direct voltage can be applied between, said first input terminal being connected to the center tap of said third winding, the collector terminals of said first and second transistors being connected to the center tap of said fourth winding, the collector terminals of said third and fourth transistors being connected to said second input terminal, whereby said four transistors are connected in a series-parallel D.C. circuit between said input terminals, a pair of output terminals, said fifth winding being connected between said output terminals, a resistor connected between the center tap of said first winding and the collector terminals of said first and second transistors, a diode rectifier and a resistor in series connected between the center taps of said first and third windings, a resistor connected between the center tap of said second winding and the collector terminals of said third and fourth transistors, and a diode rectifier and a resistor in series connected between the center taps of said second and fourth windings, said rectifiers and resistors forming bias circuits for maintaining appropriate bias voltages between the emitter and base terminals of said transistors, the relative polarities of said first and third windings and the relative polarities of said second and fourth windings being arranged to provide a cumulative switching action such that an increasing current in any of said transistors tends to increase further the currents in that transistor and to reduce the currents in the other transistor of the same pair, until the core of said transformer saturates, such saturation reversing said cumulative action so that self-sustaining oscillatory currents flow through each of said transistors, whereby direct-current power supplied to said input terminals is converted into alternating current power available at said output terminals.

2. Electrical apparatus for convering direct-current power into alternating-current power, comprising four transistors each having base, emitter and collector terminals, a saturable-core transformer having five windings, a first one of said windings being connected between the base terminals of first and second ones of said transistors, a second one of said windings being connected between the base terminals of third and fourth ones of said transistors, a third one of said windings being connected between the collector terminals of said first and second transistors, the emitter terminals of said first and second transistors being connected together, whereby said first and second transistors form a first pair, a fourth one of said windings being connected between the collector terminals of said third and fourth transistors, the emitter terminals of said third and fourth transistors being connected together, whereby said third and fourth transistors form a second pair, each of said first, second, third and fourth windings having a center tap, first and second input terminals that a direct voltage can be applied between, said first input terminal being connected to the center tap of said third winding, the emitter terminals of said first and second transistors being connected to the center tap of said fourth winding, the emitter terminals of said third and fourth transistors being connected to said second input terminal, whereby said four transistors are connected in a series-parallel D.C. circuit between said input terminals, a pair of output terminals, said fifth winding being connected between said output terminals, a resistor connected between the center taps of said first and third windings, a diode rectifier and a resistor in series connected between the center tap of said first winding and the emitter terminals of said first and second transistors, a resistor connected between the center taps of said second and fourth windings, and a diode rectifier and a resistor in series connected between the center tap of said second winding and the emitter terminals of said third and fourth transistors, said rectifiers and resistors forming bias circuits for maintaining appropriate bias voltages between the emitter and base terminals of said transistors, the relative polarities of said first and third windings and the relative polarities of said second and fourth windings being arranged to provide a cumulative switching action such that an increasing current in any of said transistors tends to increase further the currents in that transistor and to reduce the currents in the other transistor of the same pair, until the core of said transformer saturates, such saturation reversing said cumulative action so that self-sustaining oscillatory currents flow through each of said transistors, whereby direct-current power supplied to said input terminals is converted into alternating-current power available at said output terminals.

References Cited in the file of this patent

UNITED STATES PATENTS

| | | |
|---|---|---|
| 2,299,094 | Klemperer | Oct. 20, 1942 |
| 2,621,319 | Uhlmann | Dec. 9, 1952 |
| 2,783,384 | Bright et al. | Feb. 26, 1957 |
| 2,826,731 | Paynter | Mar. 11, 1958 |
| 2,830,200 | Backman et al. | Apr. 8, 1958 |
| 2,852,730 | Magnuski | Sept. 16, 1958 |
| 2,874,293 | McMurren | Feb. 17, 1959 |

FOREIGN PATENTS

| | | |
|---|---|---|
| 536,516 | Great Britain | May 16, 1941 |